(12) United States Patent
Kim et al.

(10) Patent No.: US 11,967,746 B2
(45) Date of Patent: Apr. 23, 2024

(54) ELECTROLYTE MEMBRANE OF MEMBRANE-ELECTRODE ASSEMBLY INCLUDING ELECTRONIC INSULATION LAYER AND PREPARATION METHOD THEREOF

(71) Applicants: Hyundai Motor Company, Seoul (KR); Kia Motors Corporation, Seoul (KR)

(72) Inventors: Byoung Su Kim, Gyeonggi-do (KR); Yong Min Kim, Seoul (KR); Ha Yeong Yu, Seoul (KR); Jin Yi Choi, Gyeonggi-do (KR); Ju Ahn Park, Gyeonggi-do (KR); Ju Young Lee, Gyeonggi-do (KR); Jung Ik Kim, Gyeonggi-do (KR); Min Kyung Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 334 days.

(21) Appl. No.: 16/694,222

(22) Filed: Nov. 25, 2019

(65) Prior Publication Data
US 2020/0313216 A1    Oct. 1, 2020

(30) Foreign Application Priority Data
Mar. 28, 2019    (KR) .......................... 10-2019-0036174

(51) Int. Cl.
*H01M 8/1053* (2016.01)
*H01M 4/88* (2006.01)
(Continued)

(52) U.S. Cl.
CPC ......... *H01M 8/1053* (2013.01); *H01M 4/881* (2013.01); *H01M 4/8828* (2013.01);
(Continued)

(58) Field of Classification Search
CPC ............. H01M 8/1053; H01M 8/1004; H01M 8/1069; H01M 4/8828; H01M 4/92;
(Continued)

(56) References Cited

U.S. PATENT DOCUMENTS

| 2013/0130133 A1* | 5/2013 | Jiang | ................... | H01M 8/1018 |
| | | | | 429/409 |
| 2013/0196055 A1* | 8/2013 | Berta | .................. | H01M 8/1004 |
| | | | | 427/115 |

(Continued)

FOREIGN PATENT DOCUMENTS

| CN | 101273487 A | 9/2008 |
| JP | 5129990 B2 | 1/2013 |

(Continued)

*Primary Examiner* — Kiran Quraishi Akhtar
(74) *Attorney, Agent, or Firm* — Fox Rothschild LLP

(57) ABSTRACT

Disclosed are an electrolyte membrane of a membrane-electrode assembly including an electronic insulation layer, which greatly improves the durability of the electrolyte membrane, and a method of preparing the same. The electrolyte membrane includes an ion exchange layer and an electronic insulation layer provided on the ion exchange layer, and the electronic insulation layer includes one or more catalyst complexes, and a second ionomer Particularly, each of the one or more catalyst complex includes a catalyst particle and a first ionomer coated on the entirety or a portion of the surface of the catalyst particle, and the one or more catalyst complexes are dispersed the second ionomer.

10 Claims, 2 Drawing Sheets

(51) Int. Cl.
*H01M 4/92* (2006.01)
*H01M 8/10* (2016.01)
*H01M 8/1004* (2016.01)
*H01M 8/1069* (2016.01)

(52) U.S. Cl.
CPC ........... *H01M 4/92* (2013.01); *H01M 8/1004* (2013.01); *H01M 8/1069* (2013.01); *H01M 2008/1095* (2013.01)

(58) Field of Classification Search
CPC ......... H01M 4/881; H01M 2008/1095; H01M 4/8882; H01M 4/926; H01M 8/1018; Y02E 60/50
See application file for complete search history.

(56) References Cited

U.S. PATENT DOCUMENTS

| | | | |
|---|---|---|---|
| 2014/0147770 A1* | 5/2014 | Darling | H01M 4/926 |
| | | | 429/482 |
| 2014/0154608 A1* | 6/2014 | Nonoyama | H01M 4/8657 |
| | | | 429/529 |
| 2015/0180041 A1* | 6/2015 | Tard | H01M 4/926 |
| | | | 429/483 |

FOREIGN PATENT DOCUMENTS

| | | |
|---|---|---|
| JP | 5510181 B2 | 6/2014 |
| JP | 6036036 B2 | 11/2016 |
| KR | 20150126717 A | 11/2015 |
| KR | 101669236 B1 | 10/2016 |

\* cited by examiner

ELECTROLYTE MEMBRANE OF MEMBRANE-ELECTRODE ASSEMBLY INCLUDING ELECTRONIC INSULATION LAYER AND PREPARATION METHOD THEREOF

CROSS-REFERENCE TO RELATED APPLICATION

This application claims, under 35 U.S.C. § 119(a), the benefit of priority to Korean Patent Application No. 10-2019-0036174 filed on Mar. 28, 2019, the entire contents of which are incorporated herein by reference.

TECHNICAL FIELD

The present invention relates to an electrolyte membrane of a membrane-electrode assembly including an electronic insulation layer, which may substantially improve the durability of the electrolyte membrane, and a method of preparing the same.

BACKGROUND

In a polymer electrolyte membrane fuel cell (PEMFC), an electrolyte membrane serves to transfer hydrogen ions. In the related arts, the electrolyte membrane has been prepared using an ion exchange material in order to transfer hydrogen ions. The ion exchange material generally contains moisture in order to selectively move hydrogen ions, generated at an anode, to a cathode.

The durability of the electrolyte membrane is reduced by the deterioration of the electrolyte membrane due to the crossover of hydrogen. For example, due to the crossover of hydrogen and oxygen, the hydrogen contacts oxygen at the interface between the electrolyte membrane and the cathode, such that hydrogen peroxide is generated. The hydrogen peroxide is dissociated into a hydroxyl radical (·OH) and a hydroperoxyl radical (·OOH), whereby the electrolyte membrane is deteriorated.

In recent years, the thickness of the electrolyte membrane has been reduced in order to reduce cost and to reduce the ion resistance of the electrolyte membrane. However, the thinner the electrolyte membrane, the more the crossover amount of hydrogen. As a result, the lifespan of the electrolyte membrane gradually decreases.

In order to solve the above problem, technology for adding a small amount of catalyst to the electrolyte membrane in order to prevent the generation of radicals has been proposed. When the electrolyte membrane starts to deteriorate due to radicals formed by hydrogen peroxide, however, the chemical deterioration of the electrolyte membrane is accelerated due to the catalyst included in the electrolyte membrane. Therefore, an improvement thereof is still required.

The above information disclosed in this Background section is provided only for enhancement of understanding of the background of the invention and therefore it may contain information that does not form the prior art that is already known in this country to a person of ordinary skill in the art.

SUMMARY

In preferred aspects, provided is an electrolyte membrane of a membrane-electrode assembly which may effectively prevent deterioration of the electrolyte membrane due to the crossover of hydrogen and oxygen. Further, provided is an electrolyte membrane of a membrane-electrode assembly having remarkably improved durability.

The objects of the present invention are not limited to those described above. The objects of the present invention will be clearly understood from the following description and could be implemented by means defined in the claims and a combination thereof.

In one aspect, provided is an electrolyte membrane of a membrane-electrode assembly. The electrolyte membrane needs to be an electronic insulation layer. Not only the electrolyte membrane, but also the surrounding of catalyst complexes or compositions is required to be electronically insulated. Particularly, the electronic insulation layer may include one or more catalyst complexes or compositions, each of which may include a catalyst particle and a first ionomer coated on the entirety or a portion of the surface of the catalyst particle, and a second ionomer, which may include a polymer matrix having the catalyst complexes dispersed therein.

The term "electronic insulation layer" as used herein refers to a layer or membrane that has a substantially reduced electronic conductivity such that electric charges (e.g., electrons) do not transfer freely and no or very low electric current is created even under the applied electric field. For instance, the electronic insulating layer may have the electronic conductivity less than that of distilled water, e.g., less than about $5\times10^{-6}$ S/m, less than about $10^{-6}$ S/m, less than about $10^{-7}$ S/m, or less than about $10^{-8}$ S/m.

The ion exchange layer may suitably include a porous reinforcement layer, a first ion exchange layer provided on a first surface of the reinforcement layer, and a second ion exchange layer provided on a second surface of the reinforcement layer.

The first surface and the second surface are meant by referring to two surfaces facing opposite directions from a single planar structure (e.g., membrane, or a layer). The ion exchange layer may include an ion exchange material. Preferably, ion exchange material of the ion exchange layer may be the second ionomer.

The catalyst particle may suitably include a catalyst metal and a carbon support, for example, the catalyst metal may be supported on the carbon support.

The catalyst metal may suitably include platinum (Pt).

The first ionomer may be the same as the second ionomer. Alternatively, the first ionomer and the second ionomer may be different, for example, in molecular weights, substituent groups, or other structures. In an exemplary embodiment, the first ionomer may include a polymer material having a shorter side chain group than the second ionomer.

At least one of the first ionomer and the second ionomer may suitably include perfluorosulfonic acid (PFSA). Preferably, both the first ionomer and the second ionomer may suitably include perfluorosulfonic acid (PFSA).

The electronic insulation layer may suitably include an amount of about 0.5 wt % to 5 wt % of the catalyst particles based on the total weight of the electronic insulation layer.

In another aspect, provided is a membrane-electrode assembly including the electrolyte membrane and a pair of electrodes provided on both surfaces (e.g., first and second surfaces) of the electrolyte membrane.

In a further aspect, provided is a method of preparing an electrolyte membrane of a membrane-electrode assembly. The method may include preparing a first admixture by dispersing catalyst particles into a first ionomer solution, drying the first admixture to obtain catalyst complexes, preparing a second admixture by dispersing the catalyst complexes into a second ionomer solution, and applying the second admixture onto an ion exchange layer and drying the second admixture to form an electronic insulation layer.

The method may further include thermally treating the electronic insulation layer. The mixture having the catalyst particles dispersed therein may be dried at a temperature of about 25° C. to 160° C.

The mixture having the catalyst complexes dispersed therein may be applied onto the ion exchange layer, and may be dried at a temperature of about 25° C. to 100° C. to form the electronic insulation layer.

The electronic insulation layer may be thermally treated at a temperature of about 160° C. to 200° C.

Further provided is a fuel cell including the membrane-electrode assembly as described herein.

Other aspects of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
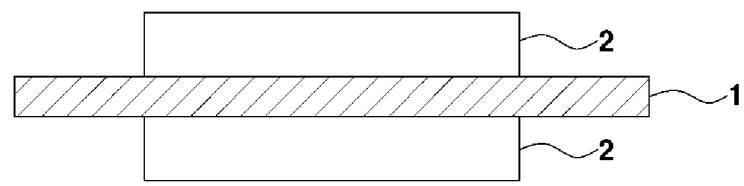
FIG. 1 shows an exemplary membrane-electrode assembly in a section view according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

The objects described above, and other objects, features and advantages will be clearly understood from the following preferred embodiments with reference to the attached drawings. However, the present invention is not limited to the embodiments and will be embodied in different forms. The embodiments are suggested only to offer thorough and complete understanding of the disclosed contents and sufficiently inform those skilled in the art of the technical concept of the present invention.

Like reference numbers refer to like elements throughout the description of the figures. In the drawings, the sizes of structures are exaggerated for clarity. It will be understood that, although the terms "first", "second", etc. may be used herein to describe various elements, corresponding elements should not be understood to be limited by these terms, which are used only to distinguish one element from another. For example, within the scope defined by the present invention, a first element may be referred to as a second element and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all numbers, figures and/or expressions. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

FIG. 1 shows a sectional view of an exemplary membrane-electrode assembly according to an exemplary embodiment of the present invention. As shown in FIG. 1, the membrane-electrode assembly may include an electrolyte membrane 1 and a pair of electrodes 2 formed on opposite surfaces of the electrolyte membrane 1. Here, "a pair of electrodes" means an anode and a cathode, which are disposed on opposing surfaces (e.g., first and second surfaces) the electrolyte membrane.

Figure 2:
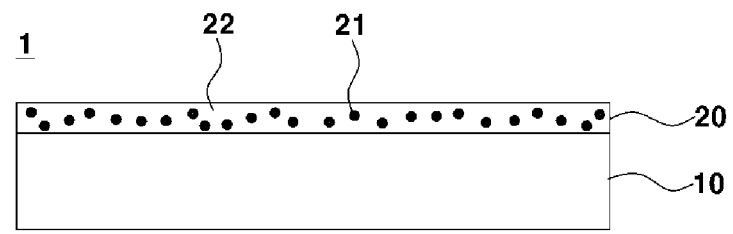
FIG. 2 shows an exemplary electrolytic membrane in a section view according to an embodiment of the present invention.

FIG. 2 shows a sectional view of an exemplary electrolytic membrane 1 according to an exemplary embodiment of the present invention. As shows in FIG. 2, the electrolytic membrane 1 may include an ion exchange layer 10 and an electronic insulation layer 20 provided on the ion exchange layer 10.

The electronic insulation layer 20 may include catalyst complexes 21 and a second ionomer 22, which may be a polymer matrix having the catalyst complexes 21 dispersed therein. The electronic insulation layer 20 may be provided for a cathode, for example, which is one of the electrodes 2.

The ion exchange layer 10, which may be included in the electrolytic membrane 1 according to an exemplary embodiment of the present invention, may be configured in the form of a single film made of an ion exchange material. The ion exchange layer 10 may further include an antioxidant.

The ion exchange material may be the same material as the second ionomer 22.

Although the ion exchange material is not particularly restricted, the ion exchange material may suitably include perfluorosulfonic acid (PFSA). For instance, the ion exchange material may include, or be nafion.

Figure 3:
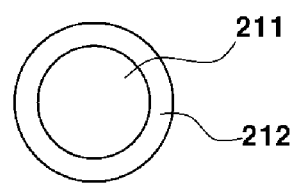
FIG. 3 shows an exemplary catalyst complex in a section view according to an embodiment of the present invention.

FIG. 3 shows a sectional view of an exemplary catalyst complex 21. As shown in FIG. 3, the catalyst complex 21 may include a catalyst particle 211 and a first ionomer 212 coated on the entirety or a portion of the surface of the catalyst particle 211 Particularly, in the catalyst complex 21, the first ionomer 212 may be coated on the entire surface of the catalyst particle 211. However, the present invention is not limited thereto.

The catalyst particle 211 may suitably include a catalyst metal supported on a carbon support. The catalyst metal may suitably include one or more of noble metal elements, which may be selected from the group consisting of platinum (Pt), gold (Au), palladium (Pd), rhodium (Rh), iridium (Ir), ruthenium (Ru), and a combination thereof. The catalyst metal may particularly include platinum (Pt).

When the crossover of hydrogen and oxygen gas occurs, the catalyst particle directly converts the hydrogen gas into water in order to inhibit the formation of radicals in the electrolytic membrane. Consequently, the chemical durability of the electrolytic membrane may be substantially improved.

However, the hydrogen gas may not be converted into water by the catalyst particle but may pass between adjacent catalyst particles and may form radicals on the interface between the cathode 2 and the electrolytic membrane. The radicals may accelerate the chemical deterioration of the second ionomer 22 of the electronic insulation layer 20, whereby the catalyst particle 211, which is in an electronically insulated state, is exposed and thus the function thereof may be lost. According to various exemplary embodiments of the present invention, a first ionomer 212 may be coated on the entirety or a portion of the surface of the catalyst particle 211. Even though chemical deterioration of the electronic insulation layer 20 occurs somewhat due to the radicals, the electronically insulated state of the catalyst particle 211 may be maintained. As a result, the improved durability of the electrolytic membrane according to the exemplary embodiments of the present invention may be maintained for a long time.

The first ionomer 212 may be the same polymer material as the second ionomer 22, or may be a polymer material having a shorter side chain group than the second ionomer 22. Preferably, a polymer material having a shorter side chain group than the second ionomer 22 may be used as the first ionomer 212, since a polymer material having a shorter side chain group may be more robust to chemical deterioration.

Each of the first ionomer 212 and the second ionomer 22 may suitably include perfluorosulfonic acid (PFSA). Particularly, the first ionomer 212 may be short side chain PFSA.

The electronic insulation layer 20 may suitably include an amount of about 0.5 wt % to 5 wt % of the catalyst particles 211 based on the total weight of the electronic insulation layer 20. When the content of the catalyst particles 211 is less than about 0.5 wt %, the effect of inhibiting the generation of radicals may be insignificant. When the content of the catalyst particles 211 is greater than about 5 wt %, ion conductivity in the electrolytic membrane 1 or the mechanical integrity of the electrolytic membrane 1 may be reduced, whereby the durability of the electrolytic membrane 1 may be reduced.

Figure 4:
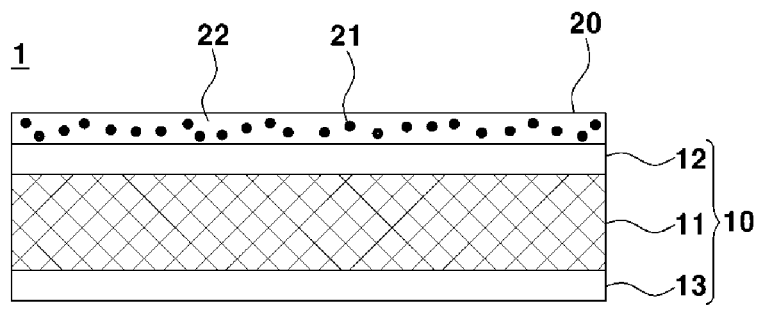
FIG. 4 shows an exemplary electrolytic membrane in a section view according to an embodiment of the present invention.

FIG. 4 shows a sectional view of an exemplary electrolytic membrane 1 according to an exemplary embodiment of the present invention. As shown in FIG. 4, the electrolytic membrane 1 may include an ion exchange layer 10 and an electronic insulation layer 20 provided on the ion exchange layer 10. The electronic insulation layer 20 may be provided for one of the electrodes 2, specifically a cathode. Alternatively, the electronic insulation layer 20 may be provided for one or both of the cathode and an anode.

For instance, the ion exchange layer 10 may include a reinforcement layer 11 for increasing the mechanical rigidity thereof, and the reinforcement layer 11 may be impregnated with an ion exchange material such that the ion exchange layer 10 has a three-layered structure.

Particularly, the ion exchange layer 10 may include a reinforcement layer 11, a first ion exchange layer 12 provided on one surface of the reinforcement layer 11, and a second ion exchange layer 13 provided on the other surface of the reinforcement layer 11.

The reinforcement layer 11 may suitably include a porous film that is made of expanded-polytetrafluoroethylene (e-PTFE) and may have therein a great number of pores.

The electronic insulation layer 20 included in the electrolytic membrane 1 according to an exemplary embodiment of the present invention may be the same as what was previously described, and a description thereof will be omitted.

Figure 5:
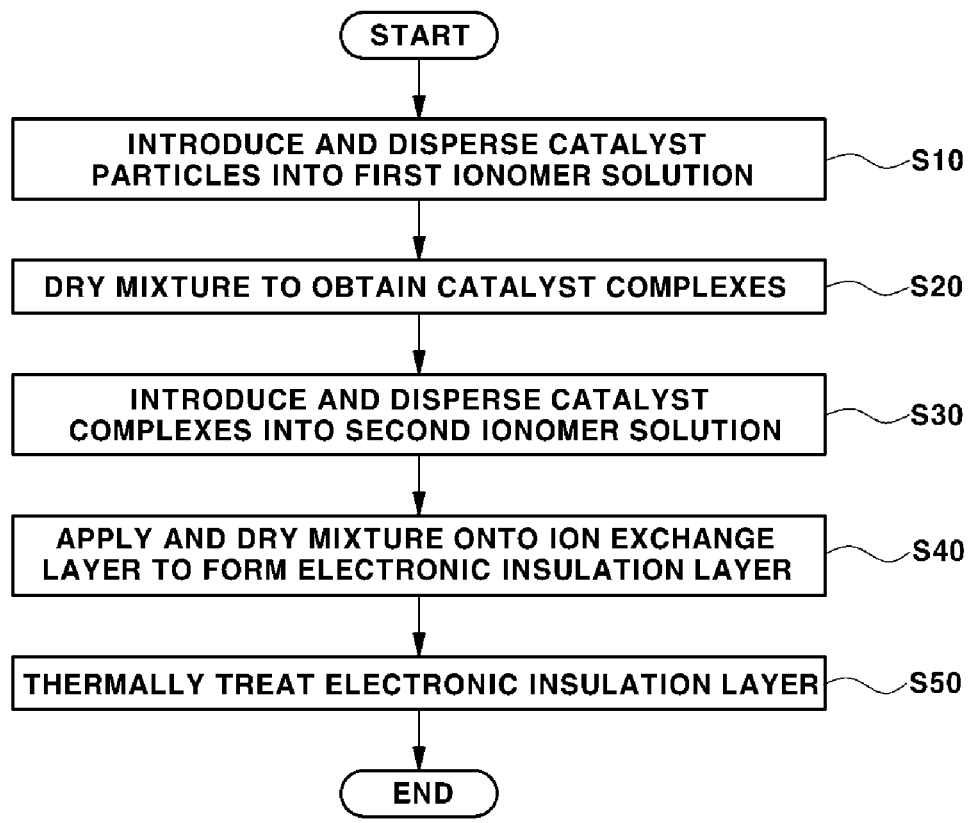
FIG. 5 shows an exemplary method of preparing an exemplary electrolytic membrane of a membrane-electrode assembly according to an exemplary embodiment of the present invention.

FIG. 5 shows a flowchart of an exemplary method of preparing an exemplary electrolytic membrane of an exemplary membrane-electrode assembly according to an exemplary embodiment of the present invention. As shown in FIG. 5, the method of preparing the electrolytic membrane may include a step of preparing a first admixture, for example, by introducing and dispersing catalyst particles into a first ionomer solution (S10), a step of drying the first admixture having the catalyst particles dispersed therein to obtain catalyst complexes (S20), a step of preparing a second admixture, for example, by introducing and dispersing the catalyst complexes into a second ionomer solution (S30), a step of applying and drying the second admixture having the catalyst complexes dispersed therein onto an ion exchange layer to form an electronic insulation layer (S40), and, optionally, a step of thermally treating the electronic insulation layer (S50).

The step of preparing the first admixture by introducing and dispersing the catalyst particles into the first ionomer solution (S10) may be carried out by an appropriate apparatus under appropriately set conditions such that the catalyst particles are uniformly dispersed in the first ionomer solution.

The first ionomer solution may be obtained by dispersing the first ionomer in a solution such as water or alcohol, or may be in the form of an emulsion of the first ionomer.

Subsequently, a mixture having the catalyst particles dispersed therein may be dried to obtain catalyst complexes (S20). The mixture may be dried at a temperature of about 25° C. or greater and less than the temperature at which the side chain of the first ionomer is lost. The temperature at which the side chain of the first ionomer is lost may vary depending on the kind of the first ionomer. For example, when the first ionomer is perfluorosulfonic acid (PFSA), the mixture may be dried at a temperature of about 25° C. to 160° C.

The catalyst complexes were previously described, and therefore a further description thereof will be omitted.

The step of preparing the second admixture by introducing and dispersing the catalyst complexes into the second ionomer solution (S30) may be carried out by an appropriate apparatus under appropriately set conditions such that the catalyst complexes are uniformly dispersed in the second ionomer solution.

The second ionomer solution may be obtained by dispersing the second ionomer in a solution such as water or alcohol, or may be the emulsion form of the second ionomer. Subsequently, the second admixture having the catalyst complexes dispersed therein may be applied and dried onto an ion exchange layer to form an electronic insulation layer (S40). The amount of the second admixture that may be applied is not particularly restricted, and may be appropriately adjusted depending on the desired thickness of the electronic insulation layer. In addition, the mixture may be dried at a temperature of about 25° C. to 100° C.

At the step of thermally treating the electronic insulation layer (S50), the electronic insulation layer may be thermally treated at a temperature of about 160° C. to 200° C. The step of forming the electronic insulation layer (S40) and the step of thermally treating the electronic insulation layer (S50) may be continuously or discontinuously carried out.

According to various exemplary embodiments of the present invention, an electrolytic membrane may include an electronic insulation layer capable of blocking air in order to prevent hydrogen peroxide, formed due to the crossover of hydrogen, from being dissolved into radicals, whereby the chemical durability of the electrolytic membrane may be greatly improved.

Moreover, the catalyst particles included in an electronic insulation layer may be coated with an ionomer such that the catalyst particles may be maintained in an electronically insulated state even when the electrolytic membrane is chemically deteriorated, whereby the chemical durability of the electrolytic membrane may be further greatly improved.

The effects of the present invention are not limited to those mentioned above. It should be understood that the effects of the present invention include all effects that can be inferred from the foregoing description of the present invention.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An electrolyte membrane of a membrane-electrode assembly, comprising:
   an ion exchange layer; and
   an electronic insulation layer provided on the ion exchange layer,
   wherein the electronic insulation layer comprises:
   one or more catalyst complexes, each of which comprises a catalyst particle and a first ionomer coated on an entire surface of all of the catalyst particle; and
   a second ionomer comprising a polymer matrix dispersing the one or more catalyst complexes,
   wherein the first ionomer comprises a polymer material having a shorter side chain group than the polymer matrix of the second ionomer.

2. The electrolyte membrane according to claim 1, wherein the ion exchange layer comprises a porous reinforcement layer, a first ion exchange layer provided on a first surface of the reinforcement layer, and a second ion exchange layer provided on a second surface of the reinforcement layer.

3. The electrolyte membrane according to claim 1, wherein the ion exchange layer comprises an ion exchange material.

4. The electrolyte membrane according to claim 3, wherein the ion exchange material is the same as the second ionomer.

5. The electrolyte membrane according to claim 1, wherein the catalyst particle comprises a catalyst metal and a carbon support, wherein the catalyst metal is supported on the carbon support.

6. The electrolyte membrane according to claim 5, wherein the catalyst metal comprises platinum (Pt).

7. The electrolyte membrane according to claim 1, wherein at least one of the first ionomer and the second ionomer comprises perfluorosulfonic acid (PFSA).

8. The electrolyte membrane according to claim 1, wherein the electronic insulation layer comprises an amount of about 0.5 wt % to 5 wt % of the catalyst particles based on the total weight of the electronic insulation layer.

9. A membrane-electrode assembly comprising:
   an electrolyte membrane according to claim 1; and
   a pair of electrodes provided on both surfaces of the electrolyte membrane.

10. A fuel cell comprising a membrane-electrode assembly according to claim 9.

* * * * *